US008861481B2

(12) United States Patent
Seo et al.

(10) Patent No.: US 8,861,481 B2
(45) Date of Patent: Oct. 14, 2014

(54) METHOD AND APPARATUS FOR MEASURING QUALITY OF WIRELESS CHANNELS

(75) Inventors: Jeong-hwan Seo, Suwon-si (KR); Se-hong Kim, Suwon-si (KR); Byung-in Mun, Suwon-si (KR); Sang-su Nam, Seoul (KR); Hye-eun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1511 days.

(21) Appl. No.: 11/510,750

(22) Filed: Aug. 28, 2006

(65) Prior Publication Data
US 2007/0047461 A1 Mar. 1, 2007

(30) Foreign Application Priority Data

Aug. 27, 2005 (KR) .................. 10-2005-0079129

(51) Int. Cl.
| | |
|---|---|
| *H04B 7/216* | (2006.01) |
| *H04L 1/20* | (2006.01) |
| *H04B 17/00* | (2006.01) |
| *H04W 74/08* | (2009.01) |
| *H04L 12/26* | (2006.01) |
| *H04W 72/00* | (2009.01) |
| *H04B 17/02* | (2006.01) |
| *H04L 1/18* | (2006.01) |

(52) U.S. Cl.
CPC .............. *H04L 1/206* (2013.01); *H04L 1/1867* (2013.01); *H04B 17/0042* (2013.01); *H04W 74/0816* (2013.01)
USPC ........ 370/335; 370/252; 455/450; 455/452.2; 455/135

(58) Field of Classification Search
USPC .............. 370/252, 338; 455/450, 452.2, 135, 455/161.1–3, 277.1–2
See application file for complete search history.

(56) References Cited

U.S. PATENT DOCUMENTS

| | | | | |
|---|---|---|---|---|
| 4,661,902 | A | * | 4/1987 | Hochsprung et al. .......... 370/448 |
| 5,164,942 | A | * | 11/1992 | Kamerman et al. .......... 370/334 |
| 6,052,594 | A | * | 4/2000 | Chuang et al. ................ 455/450 |
| 6,067,291 | A | * | 5/2000 | Kamerman et al. .......... 370/338 |

(Continued)

FOREIGN PATENT DOCUMENTS

| | | |
|---|---|---|
| CN | 1515127 A | 7/2004 |
| CN | 1585404 A | 2/2005 |

(Continued)

OTHER PUBLICATIONS

Communication dated Jun. 7, 2011 issued by the Japanese Patent Office in counterpart Japanese Patent Application No. 2006-229806.

(Continued)

*Primary Examiner* — Kent Chang
*Assistant Examiner* — Chayce Bibbee
(74) *Attorney, Agent, or Firm* — Sughrue Mion, PLLC

(57) ABSTRACT

A method and apparatus for measuring the quality of wireless channels based on a result obtained by measuring contentions between stations in a wireless network employing a carrier sense multiple access/collision avoidance (CSMA/CA) medium access control (MAC) method specified in the IEEE 802.11 standard are provided. The method includes determining contentions between stations to transmit frames via a wireless channel that uses a contention-based medium access method, and measuring the quality of the wireless channel based on the determined contentions.

12 Claims, 7 Drawing Sheets

(56) References Cited

U.S. PATENT DOCUMENTS

| | | |
|---|---|---|
| 2002/0159418 A1 | 10/2002 | Rudnick et al. |
| 2003/0147415 A1 | 8/2003 | Dore et al. |
| 2005/0157676 A1* | 7/2005 | Kwak et al. .................. 370/328 |
| 2005/0276276 A1* | 12/2005 | Davis ............................ 370/447 |

FOREIGN PATENT DOCUMENTS

| | | |
|---|---|---|
| JP | 1056470 A | 2/1998 |
| JP | 2003-188883 A | 7/2003 |
| JP | 2006-519569 A | 8/2006 |
| KR | 2003-0043926 A | 6/2003 |
| WO | 03067916 A1 | 8/2003 |
| WO | 2004105290 A2 | 12/2004 |

OTHER PUBLICATIONS

Communication issued on Jan. 10, 2012 by the Japanese Patent Office in the counterpart Japanese Patent Application No. 2006-229806.

* cited by examiner

FIG. 9

|  | 132 -> 159 | 172 -> 136 | 134 -> 173 | 146 -> 137 | 179 -> 160 | T |
|---|---|---|---|---|---|---|
|  | RANDOM Selection | RANDOM Selection | RANDOM Selection | RANDOM Selection | RANDOM Selection |  |
| 1st | 3.59 | 3.42 | 2.74 | 2.09 | 0.24 | 12.08 |
| 2nd | 1.22 | 1.24 | 2.21 | 0.34 | 0.18 | 5.19 |
| 3rd | 0.71 | 0.31 | 0.69 | 0.26 | 3.31 | 5.28 |
| 4th | 1.63 | 3.44 | 1.39 | 0.38 | 0.28 | 7.12 |
| 5th | 1.02 | 2.84 | 3.72 | 0.61 | 0.21 | 8.4 |
| AVERAGE | 1.634 | 2.25 | 2.15 | 0.736 | 0.844 | 7.614 |
|  | quality estimation selection | quality estimation selection | quality estimation selection | quality estimation selection | quality estimation selection |  |
| 1st | 1.9 | 1.96 | 2.46 | 0.45 | 1.47 | 8.24 |
| 2nd | 1.55 | 2.81 | 2.17 | 0.39 | 1.15 | 8.07 |
| 3rd | 2.16 | 2.88 | 2.83 | 0.52 | 0.83 | 9.22 |
| 4th | 1.99 | 2.27 | 3.19 | 0.79 | 1.8 | 10.04 |
| 5th | 2.02 | 2.67 | 3.19 | 0.97 | 0.42 | 9.27 |
| AVERAGE | 1.924 | 2.518 | 2.768 | 0.624 | 1.134 | 8.968 |

METHOD AND APPARATUS FOR MEASURING QUALITY OF WIRELESS CHANNELS

This application claims the priority from Korean Patent Application No. 10-2005-0079129, filed on Aug. 27, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to measuring the quality of wireless channels, and more particularly, to measuring the quality of wireless channels by measuring contentions between stations in a wireless network employing a carrier sense multiple access/collision avoidance (CSMA/CA) medium access control (MAC) method specified in the IEEE 802.11 standard.

2. Description of the Related Art

To improve the performance of apparatuses for transmitting wireless data, it is necessary to measure the quality of wireless channels that transmit/receive data frames. The measured quality of wireless channels can be a standard index for providing users with high quality services. For example, in a plurality of wireless channels, when a current wireless channel is of bad quality, the best quality wireless channel is selected by measuring the quality of the wireless channels. The quality of wireless channels is influenced by the strength of radio signals, contentions caused by a plurality of wireless stations using a common channel, etc.

To effectively use the function of a network in transmitting/receiving data via wired or wireless networks, a standard communication specification regarding what, how, and when to communicate between objects is provided, which is called a protocol. A communication protocol based on an open systems interconnection (OSI) 7-layer structure is determined according to the characteristic of a network, such as whether the protocol is used for wired or wireless networks, what transfer medium is used to transmit data, etc.

When the OSI 7-layer uses a wireless local area network (LAN) as a transfer medium, a data link layer and a physical layer perform a function of the wireless LAN as specified in wireless LAN standards. The data link layer mainly controls wireless link errors, access of nodes to a wireless network, etc. The physical layer mainly transmits wireless packets via wireless frequencies. Data link layer can be classified as logical link control layers and MAC layers. The logical link control layer synchronizes an OSI layer 2 and controls errors of the layer. The MAC layer controls access of neighboring nodes and a wireless medium so that a plurality of nodes can effectively use the transfer medium without collision. The IEEE 802.11 wireless LAN standards specify the function of the MAC layer and the physical layer.

MAC can be a contention-free method that divides channels into a frequency division multiple access (FDMA) channel or a time division multiple access (TDMA) channel based on time and frequency bands and maps a specific channel to be used by a specific user only, or a contention method in which a medium is shared by many users, access is allowed to the medium whenever users transmit data, and, if a contention occurs, the contention is resolved using an algorithm. Carrier sense multiple access/collision avoidance (CSMA/CA) is a representative contention-based MAC protocol in which a carrier sensing scheme is used to check a transfer medium and control access to the transfer medium so that a transmission node does not waste transmission capacity caused by collisions of frames of data by avoiding the collisions. The CSMA/CA method is used as the MAC standard in the IEEE 802.11.

FIG. 1 illustrates the CSMA/CA method using a random backoff process. Referring to FIG. 1, distribute inter-frame space (DIFS) indicates spaces between frames to protect frame transmission.

A first station that wishes to transmit frames senses the status of a channel. If the channel is idle, the first station transmits the frames. Otherwise, if the channel is sensed busy, the first station waits for a period of time before it transmits the frames (Defer Access), which is a backoff process. The period of time during which the transmission of frames is detected is randomly determined just before proceeding to a backoff process, which is a backoff time. When other stations finish using the channel, it is checked that the channel is idle during the DIFS time. To avoid collision with a second station that waits for the transmission of frames, a backoff timer is set equal to the backoff time, and, if the backoff timer is reduced to 0, the second station can transmit the frames.

The backoff time may not fully elapse before a station transmits the frames but a period of time in which the channel is sensed busy is used during the backoff process. The station initializes the backoff timer to the backoff time when entering the backoff process, reduces the backoff timer only while the channel is idle, and, if the backoff timer is reduced to 0, transmits the frames. Therefore, the station that is reducing the backoff timer when the channel is idle, if the channel is busy, stops the backoff timer, waits for a period of time, and, if the channel is idle again, transmits the frames. In the CSMA/CA method, a control packet such as Request to Send/Clear to Send (RTS/CTS) is used to determine when a station uses the channel and prevent other stations from using the transfer medium for a period of time, thereby reducing possibilities of collisions in wireless channels.

FIG. 2 illustrates transmissions of frames when a CSMA/CA based contention occurs, and also illustrates how a plurality of stations resolve the contention and transmit frames using a CSMA/CA based random backoff process.

Referring to FIG. 2, stations B, C, and D check whether a channel is idle or busy when they have a frame to transmit. Since the channel is busy when a station A transmits a frame, stations B, C, and D do not transmit their frames immediately and enter a backoff process. During the backoff process, stations B, C and D set a backoff time randomly, wait until the channel is idle, operate the backoff timer, and reduce the backoff time. After station A finishes the transmission of the frame, stations B, C, and D remain under the backoff process. Because station C had the shortest backoff time, it occupies the channel first and transmits its frame.

Once station C occupies the channel, other stations determine that the channel is busy. Stations B and C that were operating their respective backoff timers stop the backoff timers and wait until the channel is idle again. While station C transmits the frame, a station E that has a frame to transmit cannot transmit the frame since the channel is busy and enters the backoff process as the stations B and D do so. By continuously performing these operations, station B transmits the frame when its backoff timer is reduced to 0 when the channel has an idle status.

In the CSMA/CA method, a station confirms whether it succeeds in transmitting a frame by receiving an acknowledgement (ACK) frame. If the station fails to receive the ACK frame within a designated time, the station decides that a channel error occurred or channels collided during the transmission of the frame and transmits the frame again through the backoff process. The number of attempts a station will make to transmit a frame is restricted. If the station fails to transmit the frame within the restricted number of transmission attempts, the station gives up transmitting the frame.

The CSMA/CA MAC method aims at effectively resolving contentions since a specific station does not use a specific channel such as TDMA or FDMA but a plurality of stations use a common channel. A contention based CSMA/CA MAC method is affected by link quality, which is lowered due to insecurity of signals such as noise or interference occurring in a physical channel, and contentions between stations. Therefore, systems employing the CSMA/CA MAC method must focus on the contention between stations when measuring the quality of wireless channels such as link throughput.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for measuring the quality of wireless channels based on contentions between stations that use a common wireless channel.

According to an aspect of the present invention, there is provided a method of measuring the quality of wireless channels, the method comprising: calculating contentions between stations to transmit frames via a wireless channel that uses a contention-based medium access method; and measuring the quality of the wireless channel based on the calculated contentions.

The contentions may be calculated based on a number of the transmission is deferred per frame, and the quality of the wireless channel may be measured using an effective frame transmission speed.

According to another aspect of the present invention, there is provided a method of measuring the quality of wireless channels, the method comprising: measuring a number of transmission is deferred per frame in a wireless network to which a plurality of stations are connected; and calculating a contention coefficient indicating how much a frame transmission speed is affected by contentions between the stations based on the measured number of the frame transmission is deferred per frame.

According to another aspect of the present invention, there is provided a method of measuring the quality of wireless channels, the method comprising: calculating a contention rate between a plurality of stations in a wireless network to which the stations are connected via a plurality of wireless links; and selecting one of the wireless links as a communication link based on the calculated contention rate.

According to another aspect of the present invention, there is provided an apparatus for measuring the quality of wireless channels, the apparatus comprising: a signal quality analyzer calculating a transmission speed of a physical channel in a wireless network to which a plurality of stations are connected; a contention analyzer calculating a contention coefficient indicating how much a frame transmission speed is affected by contentions between the stations; and an effective transmission speed calculator calculating an effective transmission speed for effectively transmitting frames via the wireless network based on the contention coefficient and the transmission speed of the physical channel.

According to another aspect of the present invention, there is provided an apparatus for measuring the quality of wireless channels, the apparatus comprising: a contention analyzer calculating a contention rate between a plurality of stations in a wireless network to which the stations are connected via a plurality of wireless links; a signal quality analyzer calculating a transmission speed of a physical channel in a wireless network; an effective transmission speed calculator calculating effective transmission speeds for effectively transmitting frames via each of the wireless links based on the contention rate and the transmission speed of the physical channel; and a link assignment block assigning one of the wireless links as a communication link based on the calculated effective transmission speed.

A computer-readable recording medium on which a program enabling the above-mentioned method is recorded.

BRIEF DESCRIPTION OF THE DRAWINGS

The above and other aspects of the present invention will become more apparent by describing in detail exemplary embodiments thereof with reference to the attached drawings in which:

FIGS. 8 and 9 are diagrams illustrating the comparison between frame transmissions via a general wireless channel and a wireless channel selected using a method of measuring the quality of wireless channels according to an exemplary embodiment of the present invention.

DETAILED DESCRIPTION OF EXEMPLARY EMBODIMENTS OF THE PRESENT INVENTION

Hereinafter, the present invention will be described more fully with reference to the accompanying drawings in which exemplary embodiments of the invention are shown.

An apparatus for measuring the quality of wireless channels according to an exemplary embodiment of the present invention, not necessarily restricted thereto, is applied to a wireless network environment that uses a CSMA/CA MAC method specified in the IEEE 802.11 standard.

Figure 1:
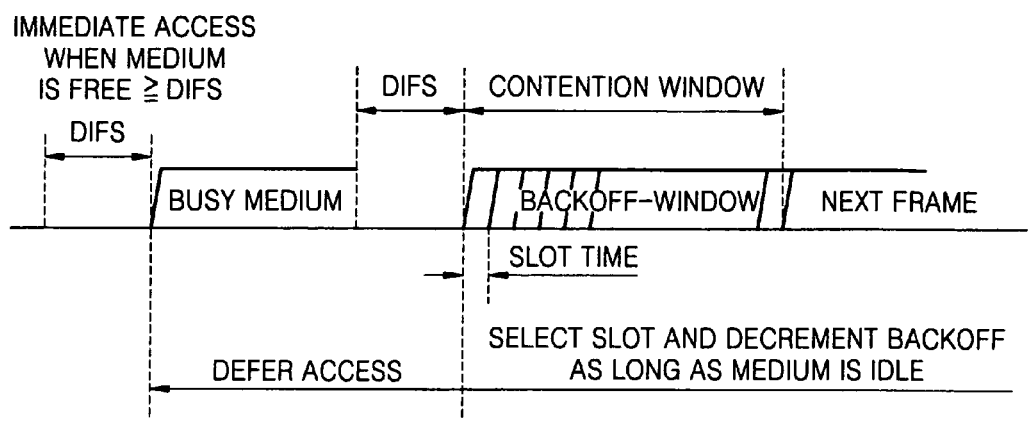
FIG. 1 illustrates a carrier sense multiple access/collision avoidance (CSMA/CA) method using a random backoff process.
Figure 2:
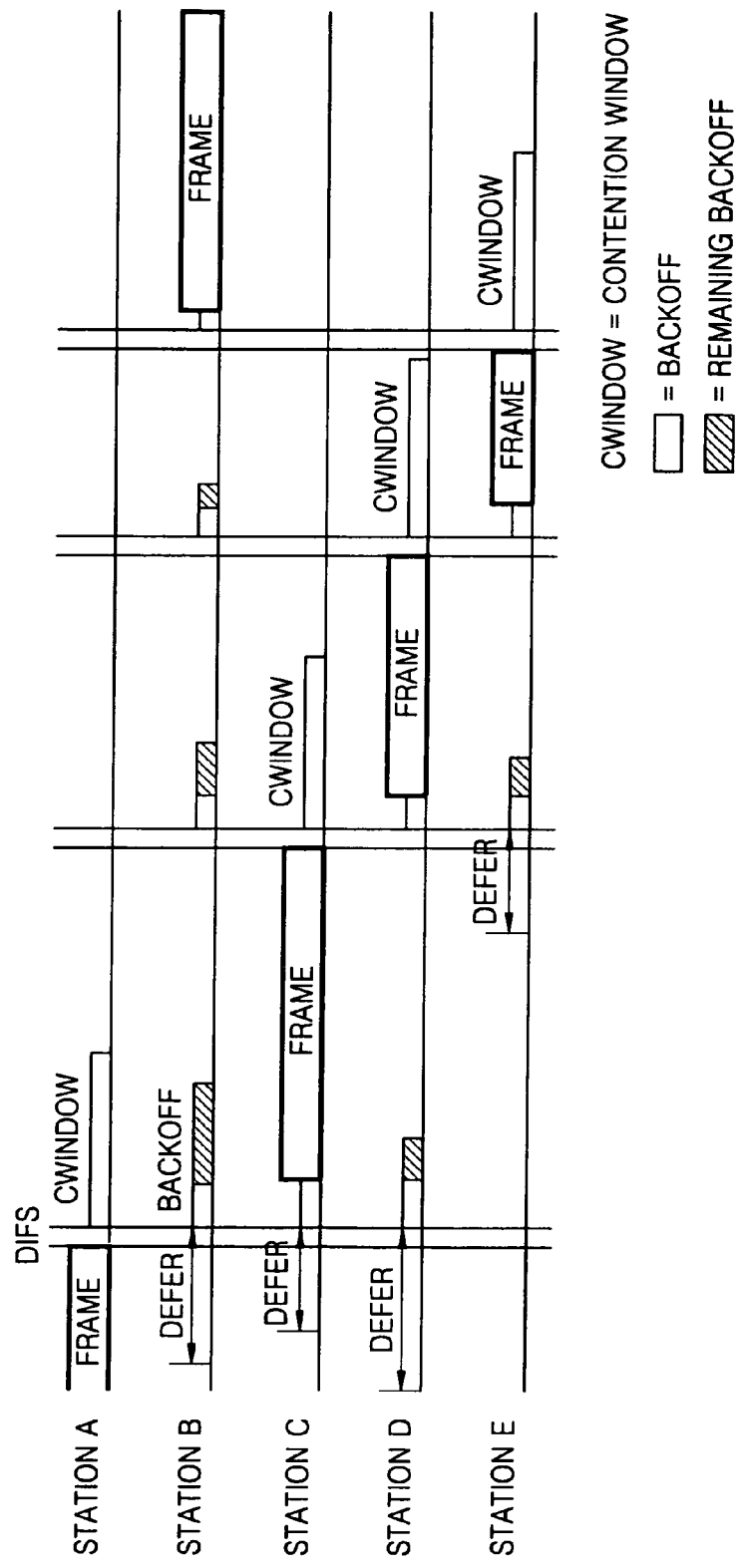
FIG. 2 illustrates transmissions of frames when a CSMA/CA based contention occurs.
Figure 3:
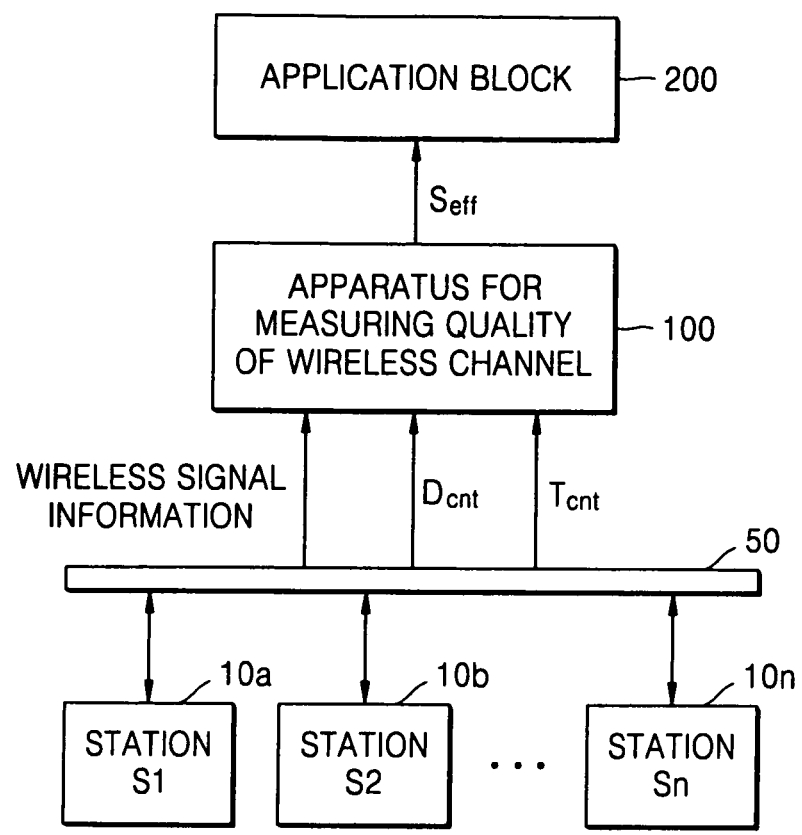
FIG. 3 illustrates a system including an apparatus for measuring the quality of wireless channels according to an exemplary embodiment of the present invention.

FIG. 3 illustrates a system including an apparatus 100 for measuring the quality of wireless channels according to an exemplary embodiment of the present invention. The apparatus 100 for measuring the quality of wireless channels is connected to stations S1, S2, . . . , Sn (10a, 10b, . . . , 10n) through device interface 50. The apparatus 100 for measuring the quality of wireless channels receives information of wireless signals such as signal strength, noise strength, data rates of wireless channels, etc., a number $D_{cnt}$ a frame transmission is deterred according to contentions, and a number $T_{cnt}$ of frame transmission attempts via the device interface 50, and calculates an effective transmission speed $S_{eff}$. The apparatus 100 for measuring the quality of wireless channels can be applied to a system comprising one or more wireless links.

The effective transmission speed $S_{eff}$ calculated by the apparatus 100 for measuring the quality of wireless channels is delivered to a higher application block 200 and is used according to application requirements. For example, if the application block 200 is a link assignment block, the apparatus 100 for measuring the quality of wireless channels compares the general quality of a plurality of wireless links based on the effective transmission speed $S_{eff}$ and selects a wireless link having the best quality to transmit a frame. A system that is not affected by or interested in the signal quality of wireless channels can use contention rates as the general quality of wireless channels.

Figure 4:
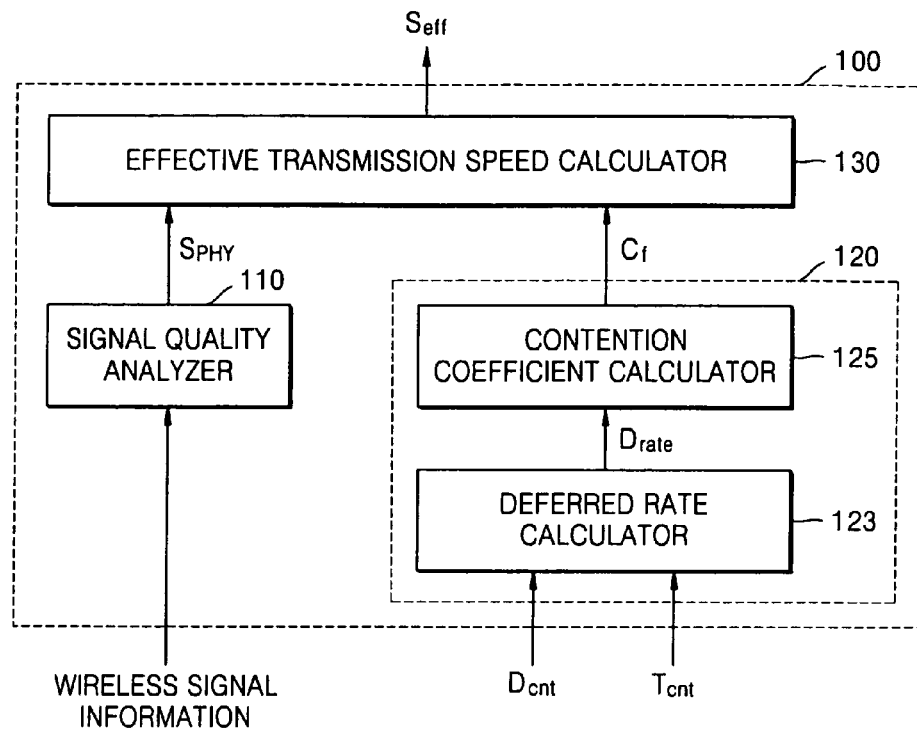
FIG. 4 is a block diagram of an apparatus for measuring the quality of wireless channels according to an exemplary embodiment of the present invention.

FIG. 4 is a block diagram of the apparatus 100 for measuring the quality of wireless channels according to an exemplary embodiment of the present invention. The apparatus 100 for measuring the quality of wireless channels comprises a signal quality analyzer 110, a contention analyzer 120, and an effective transmission speed calculator 130. The contention analyzer 120 comprises a deferred rate calculator 123 and a contention coefficient calculator 125.

The signal quality analyzer 110 analyzes the signal quality of a wireless channel $S_{phy}$ based on information of a wireless signal. The contention analyzer 120 analyzes the occurrence of contentions $C_f$ in the wireless channel based on the number of frame transmission attempts and the number of deferments. The effective transmission speed calculator 130 calculates an effective frame transmission speed $S_{eff}$, i.e., effective throughput, of the wireless channel based on the signal quality $S_{phy}$ analyzed by the signal quality analyzer 110 and the occurrence of contentions $C_f$ analyzed by the contention analyzer 120.

Figure 5:
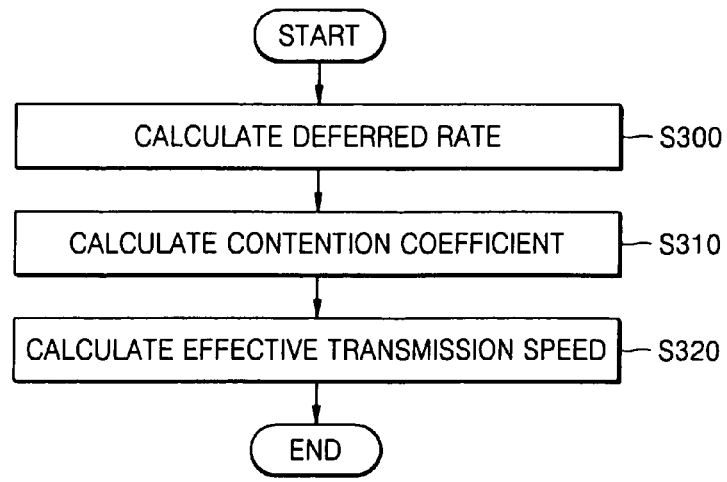
FIG. 5 is a flowchart of a method of calculating an effective frame transmission speed using the apparatus for measuring the quality of wireless channels according to an exemplary embodiment of the present invention.

FIG. 5 is a flowchart of a method of calculating the effective frame transmission speed using the apparatus 100 for measuring the quality of wireless channels according to an embodiment of the present invention. The deferred rate calculator 123 included in the contention analyser 120 receives the number $D_{cnt}$ of deferments and the number $T_{cnt}$ of frame transmission attempts via the device interface 50 and calculates a deferred rate $D_{rate}$ which is the number of deferments per frame (Operation S300). The deferred rate $D_{rate}$ can be calculated using the following:

$$D_{rate} = \frac{D_{cnt}}{T_{cnt}} \quad (1)$$

The calculated deferred rate $D_{rate}$ is used to calculate a contention coefficient $C_f$ indicating how much the frame transmission speed is actually affected by the contention. The contention coefficient $C_f$ can be calculated using the following:

$$C_f = \frac{1}{D_{rate} + 1} \quad (2)$$

The effective transmission speed calculator 130 calculates the effective transmission speed of wireless channels based on the calculated contention coefficient $C_f$ and the $S_{PHY}$ delivered from the signal quality analyzer 110, $$S_{eff} = \frac{S_{PHY}}{D_{rate} + 1} \quad (3)$$

wherein, $S_{eff}$ denotes an actual frame transmission speed, i.e., a frame transmission speed in view of the deferment effect caused by the contention. Also, $S_{PHY}$ denotes a transmission speed of the physical channel capable of transmitting a frame when the contention does not occur, and is affected by a modulation method, strength of a wireless radio signal, noise strength, etc.

Figure 6:
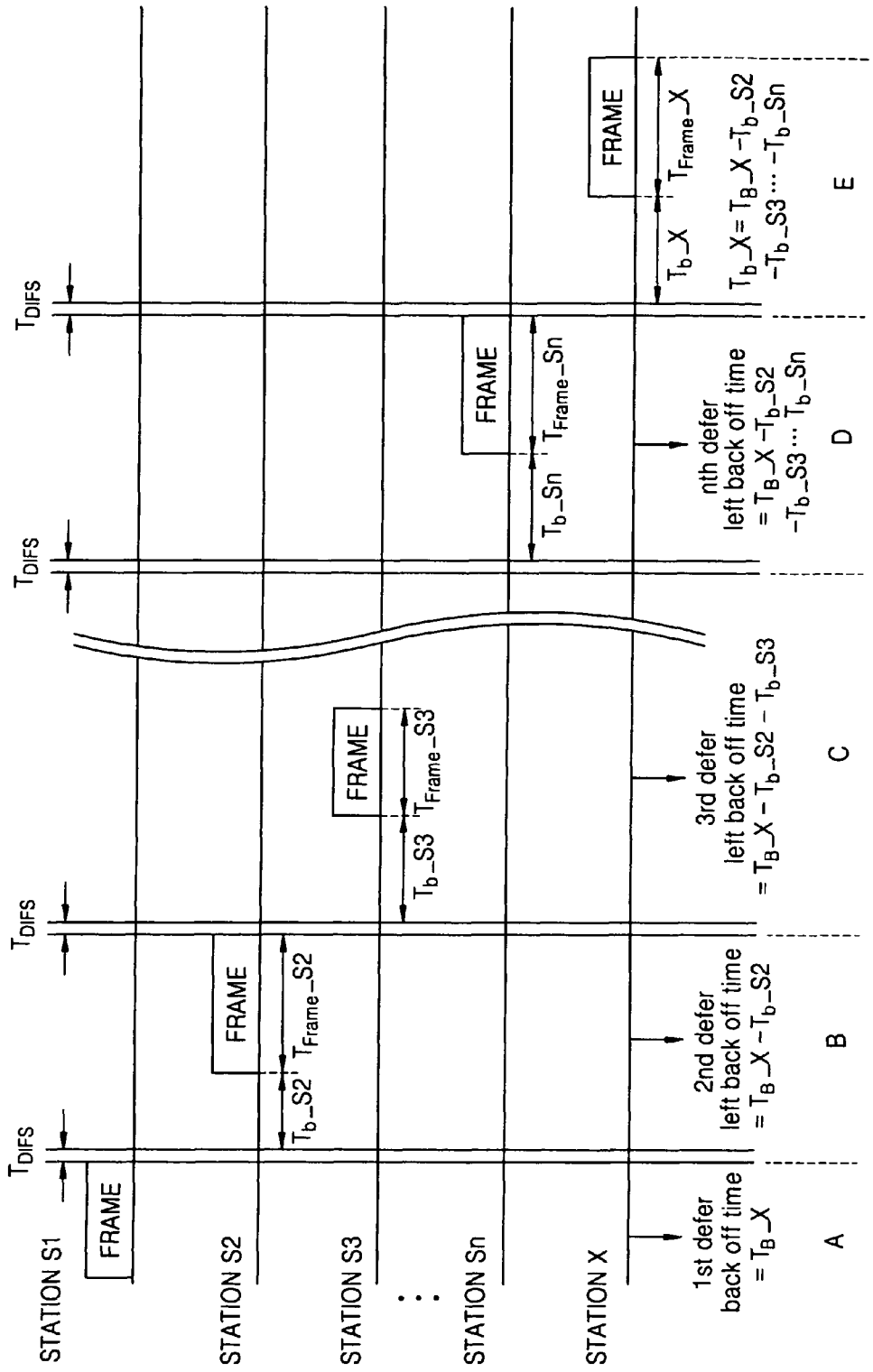
FIG. 6 is a diagram for explaining the calculation of an effective transmission speed.

FIG. 6 is a diagram for explaining the calculation of the effective transmission speed of wireless channels. Referring to FIG. 6, a plurality of stations transmit a plurality of frames via a common wireless channel while resolving contentions between the stations. A station X decides to transmit its frame and defers transmitting the frame $n^{th}$ times. During this operation, n stations resolve the contention through a CSMA/CA based backoff process while transmitting their respective frames. For simplicity, let us suppose that RTS/CTS packets are not exchanged and packet collisions do not occur.

The following is the definition of coefficients:

$T_{DIFS}$: length of time of distribute inter-frame space (DIFS)

$T_{b\_Si}$: length of time backed off by a station i from DIFS until the station i attempts to transmit a frame until finishing the transmission of the frame.

$T_B\_X$: length of backoff time decided by a station X to perform a backoff process and defer transmitting a frame after determining that a channel is busy when the station X initially senses the channel for the frame transmission $T_{Frame}$: length of time required by the station i to transmit the frame including time required by a receiver to transmit a shortest inter frame sequence (SIFS)-after-ACK frame after the station i transmits the frame $L_{FRAME\_}X$: bytes of data frames transmitted by the station X $L_{FRAME}$: bytes of data frames when assuming that stations transmit the same bytes of data frames $T_{FRAME}$: length of time required to transmit a data frame of $L_{FRAME}$ in a physical layer The station X and its neighboring nodes, i.e., stations S1, S2, S3, . . . , Sn provide frame services as follows: The station X decides to transmit a frame, senses a channel busy in section A, and enters a first deferment process. The station X determines $T_B\_X$ as a backoff time, sets its backoff timer to $T_B\_X$, and performs a backoff process. The backoff timer of the station X does not operate when the channel is busy. The $T_B\_X$ set by the backoff timer is reduced after a DFIS section when the channel is idle.

After the first deferment process, since a station S2 transmits a frame in section B and thus the channel is busy again, the station X performs a second deferment process. After the first and second deferment processes, if other stations use the channel in sections C and D, the station X determines to defer transmitting the frame, stops the backoff timer, and performs a backoff process. When the channel is idle again, the station X reduces $T_B\_X$ set by the backoff timer. Finally, when the backoff timer is 0 in section E, the station X transmits its data frame.

In this regard, the effective frame transmission speed of the station X can be calculated as follows:

$$S_{\text{eff}} = \frac{L_{FRAME}}{\text{total time required to transmit the frame}} \quad (4)$$

The total time required by the station X to transmit the frame is the time required in each of the sections A through E, as illustrated in FIG. 6, which is summarized as follows:

$$\begin{aligned}
\text{total time required to transmit the frame} &= T_{FRAME\_S1} + (T_{DIFS} + T_{b\_S2} + T_{FRAME\_S2}) + \\
&\quad (T_{DIFS} + T_{b\_S3} + T_{FRAME\_S3}) + \ldots + \\
&\quad (T_{DIFS} + T_{b\_Sn} + T_{FRAME\_Sn}) + \\
&\quad (T_{DIFS} + T_{b\_X} + T_{FRAME\_X}) \\
&= (T_{FRAME\_S1} + T_{FRAME\_S2} + \ldots + T_{FRAME\_Sn} + T_{FRAME\_X}) + \\
&\quad n \times T_{DIFS} + (T_{b\_S2} + T_{b\_S3} + \ldots + T_{b\_Sn} + T_{b\_X}) \\
&= (T_{FRAME\_S1} + T_{FRAME\_S2} + \ldots + T_{FRAME\_Sn} + T_{FRAME\_X}) + \\
&\quad n \times T_{DIFS} + T_{b\_X}
\end{aligned} \quad (5)$$

When the application layer has large volume data such as during a file transmission process, suppose that an MAC layer transmits similar volume data since a transport layer or a data link layer performs defragmentation to have the same volume data as that of the application layer. Therefore, let us suppose that the length of a data frame is $L_{FRAME}$ and the length of time required to transmit the data frame is $T_{FRAME}$. The total time required by the station X to transmit the frame is as follows:

$$\begin{aligned}
\text{total time required to transmit the frame} &= (n+1) \times T_{FRAME} + n \times T_{DIFS} + T_{B\_X} \\
&= n \times (T_{FRAME} + T_{DIFS}) + T_{FRAME} + T_{B\_X}
\end{aligned} \quad (6)$$

The data frame is much longer than inter-frame space and a backoff time is not likely to have a large value unless the data frame is retransmitted, such that $T_{FRAM} \gg T_{DIFS}$ and $T_{FRAM} \gg T_{B\_X}$. The total time required to transmit the frame is as follows:

$$\text{total time required to transmit the frame} \approx (n+1) \times T_{FRAME} \quad (7)$$

Therefore, the effective transmission speed is calculated by substituting the total time required to transmit the frame obtained in Equation 7 for Equation 4 as follows:

$$\begin{aligned}
S_{\text{eff}} &\approx \frac{L_{FRAME}}{(n+1) \times T_{FRAME}} \\
&= \frac{1}{n+1} \times \frac{L_{FRAME}}{T_{FRAME}} \\
&= \frac{S_{PHY}}{n+1}
\end{aligned} \quad (8)$$

wherein, as shown in Equation 4, $S_{PHY}$ denotes a transmission speed of the physical channel capable of transmitting a frame when a contention does not occur, and n denotes the number of frame transmissions deferred by the station X. As described above, the effective transmission speed can be derived from Equation 4, thereby measuring the quality of the wireless channel.

Figure 7:
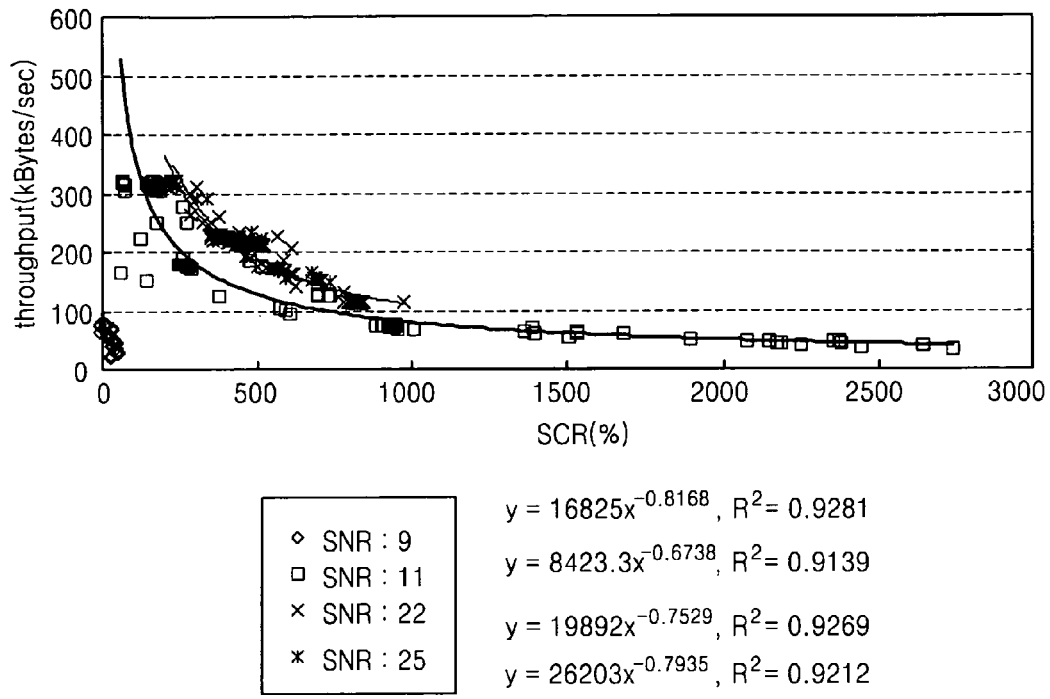
FIG. 7 is a graph illustrating variations of a self contention rate (SCR) versus variations of throughput of each of stations.

FIG. 7 is a graph illustrating variations of a self contention rate (SCR) versus variations of throughput of each of stations by adjusting the number of stations to transmit frames and vary contentions. Four receiving nodes and four corresponding transmitting nodes are provided to conduct a test, the result of which is shown in FIG. 7. The receiving nodes operate "netserver" and the transmitting nodes produce traffic to each of the receiving nodes using "netpert" to measure average throughput and an average SCR for a predetermined period of time. Only a pair of nodes communicate with each other at an initial stage and then other pairs of nodes are added one by one to measure throughput of each of nodes according to changes in the contention. During the test, the nodes are fixed to measure a change in the quality of the wireless channel according to the contention of pure nodes, more specifically, to prevent the quality of wireless channels from changing due to a change in a signal-to-noise ratio (SNR). Table 1 below shows a setting environment of the "netpert".

TABLE 1

| | |
|---|---|
| Testing tool | Netpert |
| Operation time | 300 seconds |
| Types of data | UDP STREAM |
| Size of packet | 1000 bytes |
| WLAN | 802.11b |
| Channel used | First channel (fixed) |

The result of the test shows that, in view of the SCR, as the number of the nodes, i.e., stations, increases, contentions and collisions are more correlated with each other, resulting in a change in throughput of the stations. In this regard, the SCR is in inverse proportion to the throughput as illustrated in FIG. 7. Also, the stations have different basic throughput when a contention does not occur, which is supposed to be determined by the SNR in a wireless state.

Figure 8:
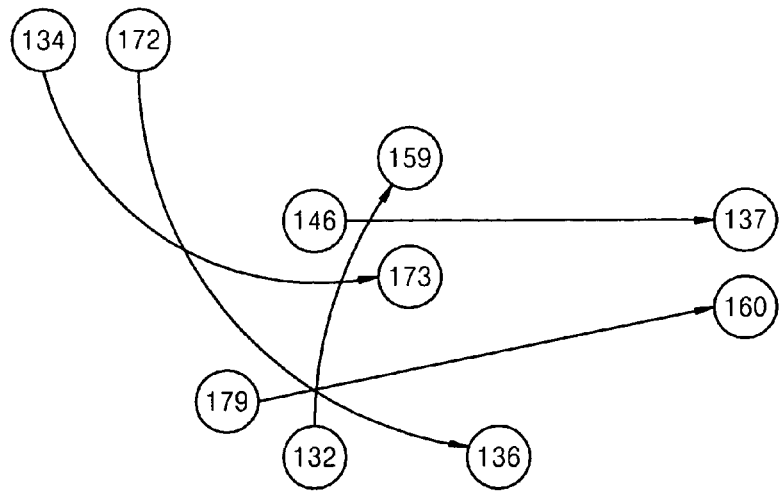

FIG. 9 is a table showing comparisons between frame transmissions via a channel randomly selected by each of nodes from channels 1, 6, 11 and a channel selected by measuring the link quality of each of the channels in an environment that includes five receiving nodes and five transmitting nodes as illustrated in FIG. 8. The quality of the channels is measured in Mbps. Referring to FIG. 9, the "RANDOM Selection" shows a result obtained by transmitting frames using a randomly selected wireless channel, whereas the "quality estimation selection" shows a result obtained by transmitting frames using the best quality wireless channel using a method of measuring the quality of wireless channels according to an embodiment of the present invention. "T" denotes the sum of columns.

Each of the nodes selects one of channels 1, 6, and 11 and communicates with the other nodes. The receiving nodes operate "netserver" and the transmitting nodes produce user datagram protocol (UDP) traffic for each of the receiving nodes using "netpert" to measure average throughput of the nodes for a predetermined period of time. Table 2 below shows a setting environment of the "netpert".

TABLE 2

| Testing tool | Netpert |
|---|---|
| Operation time | 300 seconds |
| Types of data | UDP STREAM |
| Size of packet | 1000 bytes |
| WLAN | 802.11b |
| Channel used | Channels 1, 6, and 11 (selection) |

The measurement of the link quality of the channels and selection of the best quality channel shows a better performance than the selection of a random channel. That is because a link quality measurement algorithm is used to properly determine whether the quality of a current link has deteriorated, and select a channel where a contention between the nodes rarely occurs from channels 1, 6, and 11, such that channel use efficiency is improved. The method of measuring the quality of wireless channels according to an exemplary embodiment of the present invention is used to select one of a plurality of wireless channels and transmit frames, thereby improving general communication efficiency.

The present invention can also be exemplarily embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed network coupled computer systems so that the computer readable code is stored and executed in a distributed fashion.

As described above, the present invention can more accurately measure the quality of wireless channels based on the strength of a radio signal or noise and contentions occurring when a plurality of stations use a common wireless channel in a system such as the CSMA/CA 802.11. The present invention can manage the link quality effectively by transmitting frames using the best quality wireless channel by measuring the quality of the wireless channels.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of measuring the quality of a plurality of wireless channels, the method comprising:
   determining contentions between stations that transmit frames via the wireless channel using a contention-based medium access method;
   measuring the quality of the wireless channel based on the determined contentions; and
   selecting a channel among the plurality of channels based on the measuring, wherein the contentions are determined based on a number of times the transmission is deferred per frame, and the number of times the transmission is deferred per frame is determined as being equal to a ratio of a number of frame transmission deferments to a number of frame transmission attempts, and the quality of the wireless channel is measured using an effective frame transmission speed determined as being inversely proportional to the number of times the transmission is deferred per frame.

2. The method of claim 1, wherein the stations are nodes at a medium access control (MAC) layer.

3. The method of claim 1, wherein the wireless channel uses a carrier sense multiple access/collision avoidance (CSMA/CA) medium access control (MAC) method.

4. A method of measuring the quality of wireless channels, the method comprising: determining a number of times transmission is deferred per frame as being equal to a ratio of a number of frame transmission deferments to a number of flame transmission attempts, in a wireless network to which a plurality of stations are connected; and determining a contention coefficient indicating how much a flame transmission speed is affected by contentions between the stations as being inversely proportional to the number of times the transmission is deferred per flame.

5. The method of claim 4, further comprising determining an effective transmission speed for effectively transmitting frames via the wireless network based on the contention coefficient.

6. The method of claim 5, wherein the effective transmission speed is calculated by, S pHY SeX=D, te+1
wherein, Seff denotes the effective transmission speed and Drate denotes the number of times the transmission is deferred per frame.

7. The method of claim 5, wherein: the transmission speed of the physical channel is based on a modulation method, a strength of a wireless signal, and a noise strength.

8. The method of claim 4, wherein the contention coefficient is calculated by, 1~f D r~te+1 wherein, Cf denotes the contention coefficient and Drate denotes the number of times the transmission is deferred per frame.

9. The method of claim 4, wherein the wireless network uses a carrier sense multiple access/collision avoidance (CSMA/CA) medium access control (MAC) method.

10. An apparatus for measuring the quality of wireless channels, the apparatus comprising: a signal quality analyzer which determines a transmission speed of a physical channel in a wireless network to which a plurality of stations are connected; a contention analyzer which determines a contention coefficient indicating how much a frame transmission speed is affected by contentions between the stations; and an effective transmission speed calculator which determines an effective transmission speed for effectively transmitting frames via the wireless network based on the contention coefficient and the transmission speed of the physical channel, wherein the contention analyzer comprises: a deferred rate calculator which determines a number of times transmissions are deferred per frame as being equal to a ratio of a number of frame transmission deferments to a number of frame transmission attempts, in a wireless network; and a contention coefficient calculator which determines the contention coefficient as being inversely proportional to the number of times transmissions are deferred per frame.

11. A non-transitory computer-readable recording medium having embodied thereon a computer program for executing a method of measuring the quality of a plurality of wireless channels, the method comprising: determining contentions between stations that transmit frames via the wireless channel using a contention-based medium access method; measuring the quality of the wireless channel based on the determined contentions; and selecting a channel among the plurality of channels based the measuring, wherein the contentions are determined based on a number of times the transmission is deferred per frame,-a-lag the number of times the transmission is deferred per frame is determined as being equal to a ratio of a number of frame transmission deferments to a number of frame transmission attempts, and the quality of the wireless channel is measured using an effective frame transmission speed determined as being inversely proportional to the number of times the transmission is deferred per frame.

12. A non-transitory computer-readable recording medium having embodied thereon a computer program for executing a method of measuring the quality of wireless channels, the method comprising: determining a number of times transmission is deferred per frame as being equal to a ratio of a number of frame transmission deferments to a number of frame transmission attempts, in a wireless network to which a plurality of stations are connected; determining a contention coefficient indicating how much a frame transmission speed is affected by contentions between the stations as being inversely proportional to the number of times the transmission is deferred per frame; and determining an effective transmission speed for effectively transmitting frames via the wireless network based on the contention coefficient.

* * * * *